May 10, 1960 W. SCHUESSLER 2,936,064
VIBRATORY BULK MATERIAL CONVEYOR MECHANISM
Filed Dec. 27, 1957

*INVENTOR.*
WILHELM SCHUESSLER
BY
*Christy, Parmelee & Strickland*
*attorneys.*

United States Patent Office 2,936,064
Patented May 10, 1960

2,936,064

VIBRATORY BULK MATERIAL CONVEYOR MECHANISM

Wilhelm Schuessler, Darmstadt, Germany, assignor to Dravo Corporation, Pittsburgh, Pa., a corporation of Pennsylvania Application December 27, 1957, Serial No. 705,527

13 Claims. (Cl. 198—220)

This invention relates to a mechanism for conveying and/or screening material and is for a dual unit which may be easily regulated to vary, neutralize or reverse the travel of material being processed.

Vibrating conveyors are widely used in the handling of materials, particularly in environments where the use of conveyor belt is not practical or where agitation of the material being transported is desired. Vibratory conveyors frequently have screens forming the bottoms of the conveyor trough, for screening or classifying bulk material and the term "conveyor" or "conveyor trough" as used herein is intended to include conveyors designed either for transportation or screening, or both.

Vibrating conveyors as generally constructed heretofore have been driven by means of various crank arrangements or eccentric gears. Such mechanisms always move the material with the same angle of throw and expensive control devices are required to change the speed where the capacity of the conveyor must be regulated or varied, and the structure is very greatly complicated and becomes more bulky and expensive if provision is made for reversing the direction of travel of the material.

The present invention has for its object to provide a dual conveyor with a simple exciter mechanism and an adjustment through which the rate of travel of the material may be adjusted, stopped or reversed while the mechanism is operating. A further object of this invention is to provide a conveyor and operating mechanism which is compact, and low so as to work in confined spaces.

These and other objects and advantages are secured by my invention which may be more fully understood by reference to the accompanying drawings, in which.

Figure 1:
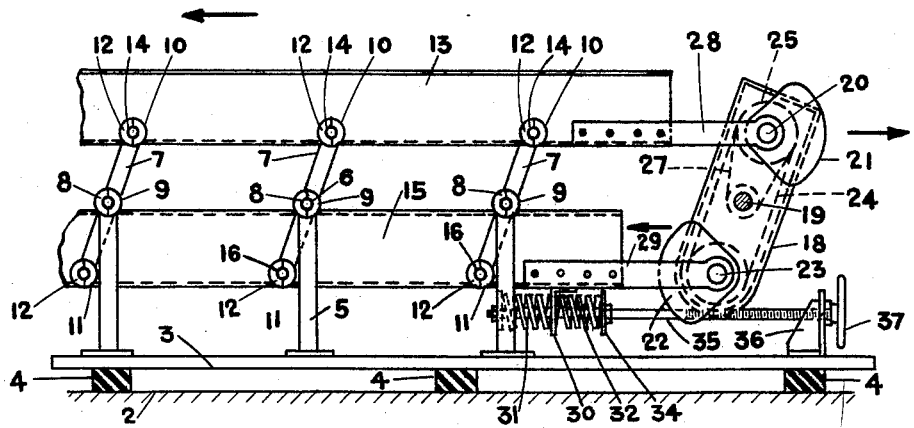
Fig. 1 shows more or less schematically a dual conveyor with the parts set to move material toward the left is viewed in this figure.

Referring to the drawing, 2 designates a supporting foundation and 3 is the bed or base of the conveyor assembly, the bed frame 3 being supported on rubber blocks or resilient supports 4. Extending upwardly from the bed at intervals along its length are rigid upright supports 5, each having a transverse pivot pin 6 at its top. This pivot pin on each post passes through the center of a vibratory arm 7, there being a rubber or elastic bushing 8 between the pivot pin and the socket 9 at the center of the arm 7 through which the pin extends, as schematically shown in the drawings.

Figure 4:
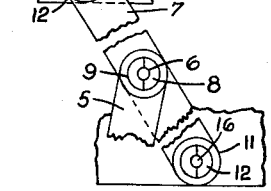
Fig. 4 is a fragmentary detail view on a larger scale showing the mounting of the conveyor pans on the support.

At the top and bottom of each arm are similar sockets 10 and 11 respectively, in which are rubber bushings 12, centered about the pins 14 and 16 as hereinafter described. Customarily the rubber bushings are made in two parts fitted into the socket as indicated in the drawings and most clearly shown in Fig. 4.

There is an upper conveyor pan or trough 13, which as above indicated, could be a screen, and it is provided along its sides with pins 14 engaged in the rubber bushings 12 in the sockets 10. Similarly 15 is a lower conveyor pan or trough having pins 16 therealong entered in the bushings 12 in the sockets 11 at the lower ends of the arms 7. The two troughs balance one another since upward movement of one results in a lowering movement of the other.

The operating mechanism or exciter comprises a frame or member 18 mounted for oscillation about a central support 19 which may also be a drive shaft.

Figure 2:
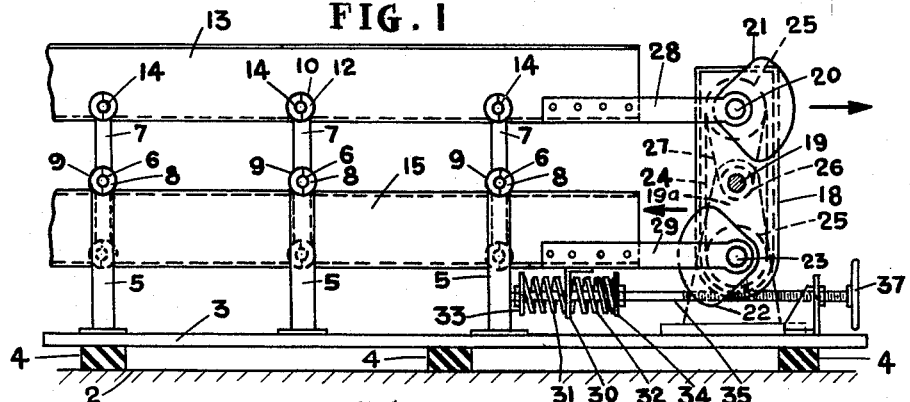
Fig. 2 is a similar view with the parts set in a neutral position.
Figure 3:
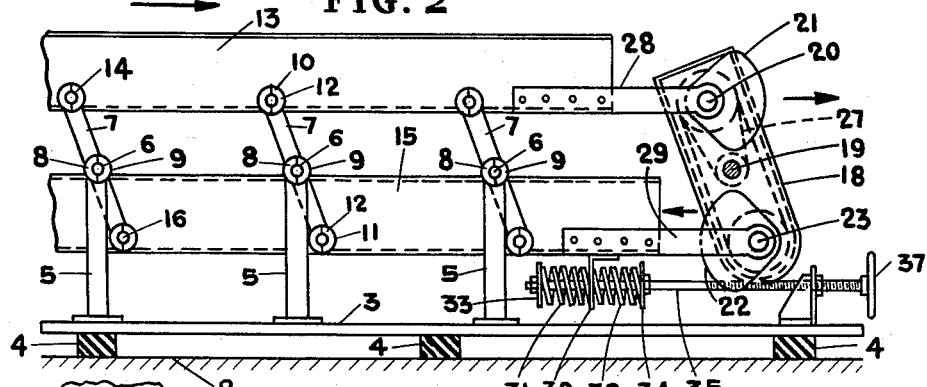
Fig. 3 is a similar view with the parts in position to move material toward the right.

In Fig. 2 I have shown an upright support 19a on the bed 3 for the shaft 19, but for clarity of illustration it is shown only in this figure, and has been omitted from Figs. 1 and 3. The frame 18 is parallel with the arms 7. Rotatably mounted at the top of the frame 18 on a shaft 20 is an eccentric weight 21, and there is a similar weight 22 on a shaft 23 at the bottom of the frame 18. The two weights are 180° out of phase, and are driven in the same direction by a chain 24 passing around sprockets 25 on the shafts 20 and 23. Shaft 19 may have a sprocket or pulley 26 thereon with a chain or belt 27 that passes around a belt or pulley on the shaft 20 for driving the two counterweights.

There is a link 28 connecting the end of the upper trough 13 to a journal about the shaft 20, and this link is in line with the several pins 14 and sockets 10. A similar link 29 is connected to the bottom pan 15 and is journaled about shaft 23, this link being in line with the sockets 11 at the lower ends of the arms or levers 7.

There is an abutment in the form of a metal tongue 30 extending down from the lower pan and projecting between the confronting ends of two opposed and equal compression springs 31 and 32, these springs having their other ends engaging abutments 33 and 34 respectively on a control rod 35. This rod is adjustable longitudinally, and it is here shown as being threaded through a nut on a fixed bracket 36 on the machine bed. The rod has a hand wheel 37 which may be turned to move the rod axially in one direction or the other. As thus arranged, the springs are operatively interposed between abutment means on the trough and rocker arm assembly and the control rod to transmit a change of position of the control rod to the trough and rocker arm assembly, while vibrating movement of the troughs is absorbed in the springs without being transmitted to the control rod.

In operation the weights are rotated at a desired speed, usually around several hundred revolutions per minute. With the parts in the position shown in Fig. 1, the weights at opposite ends of the pivoting frame are exerting a thrust tending to move the upper end of the frame toward the right and the lower end toward the left. This tends to move the troughs in a corresponding direction, but since the pans are on pivoted arms, the lower pan is given at the same time an upward thrust or impulse, tending to throw the particles in the lower trough suddenly upward and to the left. The upper pan at the same instant tends to drop away from the material in it, so that at this time there is no directional impetus given to the particles in the upper trough. As the weights rotate, they first approach each other and then reach a position 180° removed from that shown in Fig. 1, creating another impulse about the center of rotation of the frame 18, and the material in the upper pan or trough is given an impetus upwardly and toward the left while the material in the bottom trough is not moved. The material in both troughs is thus moved toward the left in Fig. 1 and the frequency of vibration is such that it seems to have almost a continuous fluid flow.

The trajectory of the particles is determined by the angular relation of the arms 7 and exciter frame 18 with reference to the bed of the machine and the troughs. If now the hand wheel is turned to bring the arms 7 and exciter frame toward a vertical position, there is less upward thrust and the trough vibrates more nearly horizontally, resulting in a less rapid movement of the material in the troughs. When the position shown in Fig. 2 is reached, the vibration will be equal in a horizontal direction and the material will have little or no travel, assuming the troughs to be level.

If the turning of the hand wheel 37 be continued to shift the slope of the exciter frame and arms 7 over center to the position shown in Fig. 3, the trajectory imparted to the material in the trough will be reversed with respect to Fig. 1 and the material in both conveyors will move toward the right as viewed in Fig. 3.

The rubber bushings in the sockets 10, 11 and 12 are formed in two parts, and they undergo elastic deformation under vibration so that the vibrating action is smooth and relatively quiet, but nevertheless effective. The amplitude of movement of the rocker arms under vibration is not large, and if additional power is needed, additional exciters of the same construction operating in isochronism may be provided. The compression springs 31 and 32 between the adjusting rod 35 and the trough permit the adjustment above described during operation and without impeding the vibration of the troughs.

For purposes of clarity of illustration, the parts have been simply and more or less diagrammatically shown and the driving motor for rotating the shaft 19 has not been shown. It will be seen that the rocker arms or levers 7 are at all times parallel with each other and with the longitudinal axis of the exciter frame, and that the troughs and links constitute means pivotally connecting the rocker arms with each other and with the exciter. It will be readily understood by those skilled in the art that the parts may be changed and otherwise constructed to embody my invention and to suit the apparatus to the purpose, material and environment in which it may be used.

I claim:

1. Vibrating conveyor apparatus comprising a supporting structure, a plurality of lever arms pivotally mounted midway between their ends on the supporting structure for oscillation in a vertical plane, an exciter comprising a lever-like frame pivotally supported midway between its ends on the supporting structure, rotatable eccentric weights on opposite ends of the exciter frame 180° out of phase with each other, means for rotating the weights in the same direction and at the same speed, means pivotally connecting the upper ends of the lever arms in parallelism with each other and with the upper end of the exciter frame, means pivotally connecting the lower ends of the lever arms in parallelism with each other and the exciter frame, and means for simultaneously adjusting the angle of the exciter frame and lever arms with reference to the supporting structure.

2. Vibrating conveyor apparatus as defined in claim 1 in which the means pivotally connecting the upper ends of the lever arms is a conveyor trough and the means connecting the lower ends of the arms is a second trough.

3. Vibrating conveyor apparatus comprising a pair of vertically spaced trough elements, parallel lever arms pivotally connected at their upper ends with the upper trough and pivotally connected at their lower ends with the lower trough, the said arms being pivotally supported between their ends on horizontal pivots for oscillation in a vertical plane on fixed supports, an exciter comprising a lever-like exciter member mounted to pivot about a horizontal axis midway between its ends and having synchronously driven eccentric weights 180° out of phase at its opposite ends, a link connecting one end of the exciter with one of the troughs and the other end of the exciter with the other trough, and means for adjusting the angular relation of the lever arms to the trough.

4. Vibrating conveyor apparatus as defined in claim 3 in which said means for adjusting the angular position of the rocker arms comprises an adjusting rod movable lengthwise with respect to the conveyor troughs and the support, a pair of opposed springs on the rod, and an abutment movable relatively to the rod confined between the confronting ends of the spring and secured to the trough and lever arm assembly so that longitudinal movement of the rod is yieldably transmitted to the assembly, and means for holding the rod in adjusted position.

5. Vibrating conveyor apparatus as defined in claim 3 in which the pivotal connection between the lever arms and the troughs and the pivotal connection between the lever arms and the fixed supports are elastically distortable.

6. Vibrating conveyor apparatus comprising upper and lower troughs, rocker arms pivotally connected at their upper ends with the upper trough and pivotally connected at their lower ends with the lower trough, fixed supports to which the rocker arms are pivotally connected at their middle for movement in a vertical arc, said levers comprising supporting means for the trough and connecting them for equal opposite motion, exciter means for imparting vibration to the troughs in a direction lengthwise of the troughs, and means for adjustably changing the angular relation of the rocker arms with respect to the troughs and supports whereby longitudinal vibration may produce a selectively variable upward thrust to the conveyors to vary the speed and direction of movement of bulk material in the troughs.

7. Vibrating conveyor apparatus as defined in claim 6 in which all pivotal connections of the rocker arms with the troughs or the supports are elastically yieldable.

8. Vibrating conveyor apparatus as defined in claim 6 in which the means for adjusting the angular relation between the rocker arms and the troughs comprises an adjusting rod adjustably movable in the direction of the length of the troughs, and a pair of opposed springs operatively interposed between the adjusting rod and one of the troughs for transmitting motion from the rod to the trough but providing for vibration of the troughs and rocker arms relatively to the adjusting rod.

9. A vibratory material transfer apparatus of the class described comprising a trough member, a plurality of levers having one end of each lever pivotally secured to the trough member, a fixed supporting means to which the levers are pivotally secured midway between their ends for oscillation in a vertical plane, means pivotally connecting the other ends of the levers and counterbalancing the trough, an exciter comprising a lever parallel with said first levers, fixed means for pivotally supporting the exciter lever midway between its ends for oscillation in a vertical plane, a rotatable eccentric weight at each end of the exciter lever, one weight being 180° out of phase with the other, means for rotating both weights in the same direction at the same speed, and a connection extending rigidly from the trough to one end of the exciter lever and pivotally attached to said end of the exciter lever.

10. A vibratory material transfer apparatus of the class described comprising a trough member, a plurality of levers having one end of each lever pivotally secured to the trough member, a fixed supporting means to which the levers are pivotally secured midway between their ends for oscillation in a vertical plane, means pivotally connecting the other ends of the levers and counterbalancing the trough, an exciter comprising a lever parallel with said first levers, fixed means for pivotally supporting the exciter lever midway between its ends for oscillation in a vertical plane, a rotatable eccentric weight at each end of the exciter lever, one weight being 180° out of phase with the other, means for rotating both weights in the same direction at the same speed, a connection extending rigidly from the trough to one end of the exciter lever and pivotally attached to said end of the exciter lever, and manual means for adjustably varying the angular relation between the fixed levers and exciter lever together relative to the trough.

11. A vibratory material transfer apparatus of the class described comprising two trough-like material-handling elements positioned one above the other, levers attached at their upper ends to one trough element and at their lower ends to the other trough element and holding the trough elements in parallel spaced counterbalancing relation, fixed supports pivotally supporting the levers midway between their ends for oscillation in a vertical plane, an exciter for vibrating the two trough elements to alternately move material therealong in the same direction comprising an exciter lever parallel with the trough-supporting levers and supported between its ends, a fixed support pivotally supporting said last-named lever between its ends for oscillation in a vertical plane, an eccentric weight rotatably mounted on the upper end of said exciter lever, an eccentric weight at the lower end of the exciter lever 180° out of phase with the first weight, means for rotating the two weights in the same direction at the same speed, an operating connection extending in line from the upper trough element to the upper end of the exciter lever and pivotally connected thereto, and a rigid operating connection extending in line with the lower trough element and pivotally connected to the lower end of the exciter lever.

12. A vibratory material transfer apparatus of the class described comprising two trough-like material-handling elements positioned one above the other, levers attached at their upper ends to one trough element and at their lower ends to the other trough element and holding the trough elements in parallel spaced counterbalancing relation, fixed supports pivotally supporting the levers midway between their ends for oscillation in a vertical plane, an exciter for vibrating the two trough elements to alternately move material therealong in the same direction comprising an exciter lever parallel with the trough-supporting levers and supported between its ends, a fixed support pivotally supporting said last-named lever between its ends for oscillation in a vertical plane, an eccentric weight rotatably mounted on the upper end of said exciter lever, an eccentric weight at the lower end of the exciter lever 180° out of phase with the first weight, means for rotating the two weights in the same direction at the same speed, an operating connection extending in line from the upper trough element to the upper end of the exciter lever and pivotally connected thereto, a rigid operating connection extending in line with the lower trough element and pivotally connected to the lower end of the exciter lever, and means for manually adjusting the trough elements endwise with respect to the fixed supports to vary the angular relation between the first levers and the exciter lever together with relation to the trough elements.

13. A vibrating conveyor apparatus as defined in claim 3 in which the said means for changing the angular position of the lever arms with respect to the troughs comprises an adjusting rod adjustably movable in a longitudinal direction relative to the troughs, a pair of spaced abutments on the rod, an abutment on the trough intermediate the two abutments on the rod and relative to which the rod is movable, a compression spring operatively interposed between the abutment on the trough and one abutment on the rod and a second compression spring opposing the first between the abutment on the trough and the other abutment on the rod, said springs serving to yieldably transmit motion from the rod to the assembly trough and lever arms, and means for adjustably holding the rod in position.

References Cited in the file of this patent
UNITED STATES PATENTS

| | | |
|---|---|---|
| 2,279,742 | Overstrom et al. | Apr. 14, 1942 |
| 2,675,907 | Becker | Apr. 20, 1954 |

FOREIGN PATENTS

| | | |
|---|---|---|
| 479,862 | Great Britain | Feb. 7, 1938 |
| 713,442 | Great Britain | Aug. 11, 1954 |